(12) United States Patent
Du Castel et al.

(10) Patent No.: US 9,416,646 B2
(45) Date of Patent: Aug. 16, 2016

(54) DETERMINING DRILL STRING STATUS IN A WELLBORE

(71) Applicant: Schlumberger Technology Corporation, Sugar Land, TX (US)

(72) Inventors: Bertrand Du Castel, Austin, TX (US); James P Belaskie, Beijing (CN); James C. Brannigan, Cypress, TX (US); John Christian Luppens, Houston, TX (US); Xueyuan Tang, Sugar Land, TX (US); Jonathan Dunlop, Cambridge (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 946 days.

(21) Appl. No.: 13/677,053

(22) Filed: Nov. 14, 2012

(65) Prior Publication Data

US 2013/0124096 A1 May 16, 2013

Related U.S. Application Data

(60) Provisional application No. 61/559,536, filed on Nov. 14, 2011.

(51) Int. Cl.
| | |
|---|---|
| *G01V 99/00* | (2009.01) |
| *E21B 47/00* | (2012.01) |
| *E21B 44/00* | (2006.01) |
| *G01L 5/00* | (2006.01) |
| *G01L 3/00* | (2006.01) |
| *G06F 17/40* | (2006.01) |
| *G06F 19/00* | (2011.01) |
| *G06F 17/10* | (2006.01) |

(52) U.S. Cl.
CPC ............... *E21B 47/00* (2013.01); *E21B 44/00* (2013.01); *G06F 17/10* (2013.01); *G06F 19/00* (2013.01); *G01L 3/00* (2013.01); *G01L 5/00* (2013.01); *G01V 99/00* (2013.01); *G06F 17/40* (2013.01)

(58) Field of Classification Search
None
See application file for complete search history.

(56) References Cited

U.S. PATENT DOCUMENTS

| | | | |
|---|---|---|---|
| 4,549,431 | A | 10/1985 | Soelinah |
| 6,174,001 | B1 | 1/2001 | Enderle |
| 2005/0087367 | A1 | 4/2005 | Hutchinson |

FOREIGN PATENT DOCUMENTS

EP   GB 2496523 A * 5/2013

OTHER PUBLICATIONS

Examination report for the equivalent GB patent application No. 2496523 issued on Feb. 8, 2013.
Lasseter, T., Karakas, M., and Schweltzer, "Interpreting an RFT-Measured Pulse Test with a Three-Dimensional Simulator," J., SPE 14878, Mar. 1988.

(Continued)

*Primary Examiner* — Edward Cosimano

(57) ABSTRACT

A method for determining a status of a drill string in a wellbore. The method can include obtaining pressure data and hook load data for the drill string. The pressure data can be filtered to obtain pressure sections. A low pressure threshold can be determined based upon the pressure sections. The hook load data can be filtered to obtain hook load sections. Hook load baselines can be determined based upon the hook load sections. Dynamic thresholds can be determined based upon the hook load baselines. An in-slips status of the drill string can be determined based upon the low pressure threshold, the dynamic thresholds, or both.

20 Claims, 13 Drawing Sheets

(56) References Cited

OTHER PUBLICATIONS

Bunn, G.F., and Yaxley, L.M., "Design, Implementation, and Interpretation of a Three-Dimensional Well Test in the Cormorant Field, North Sea," SPE 15858, Oct. 1986.
Saeedi, J., and Standen, E., "Layer Pulse Testing Using a Wireline Formation Tester," SPE 16803, Sep. 1987.
Bunn, G.F., Wittman, M.J., Morgan, W.D., and Curnutt, R.C., "Distributed Pressure Measurements Allow Early Quantification of Reservoir Dynamics in the Jene Field," SPE 17682, Mar. 1991.
Yaxley, L.M., and Blaymires, J. M., "A Field Example of Interference Testing Across a Partially Communicating Fault," SPE 19306, 1989.
Kaneda, R., Saeedi, J., and Ayestaran, L.C., "Interpretation of a Pulse Test in a Layered Reservoir," SPE 21337, Dec. 1991.

* cited by examiner

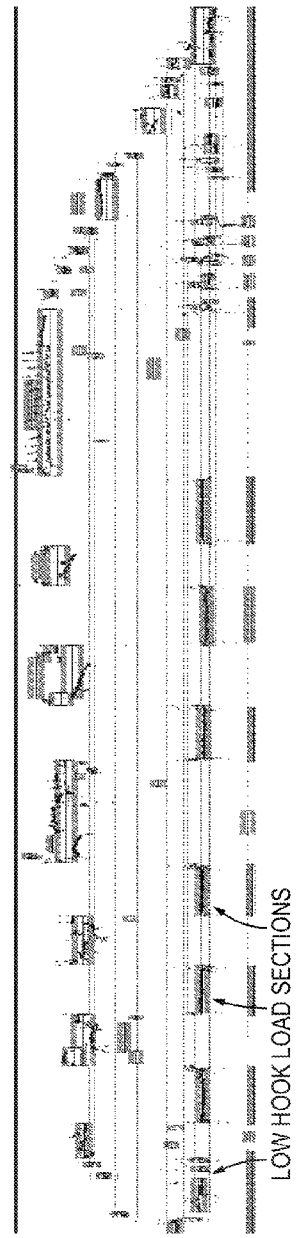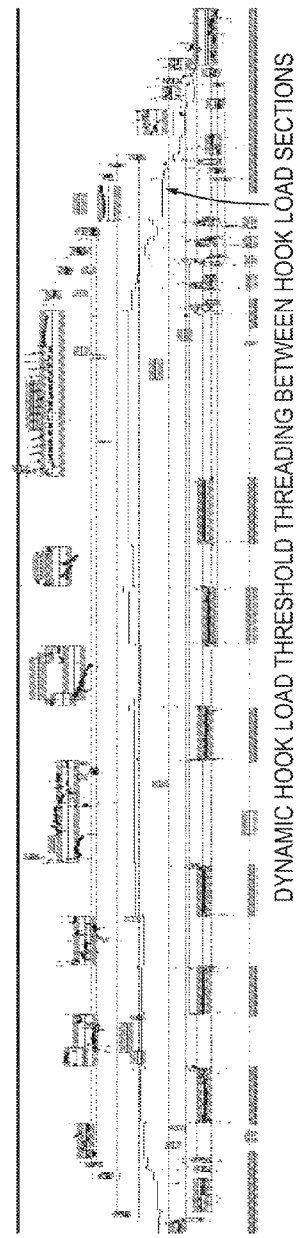

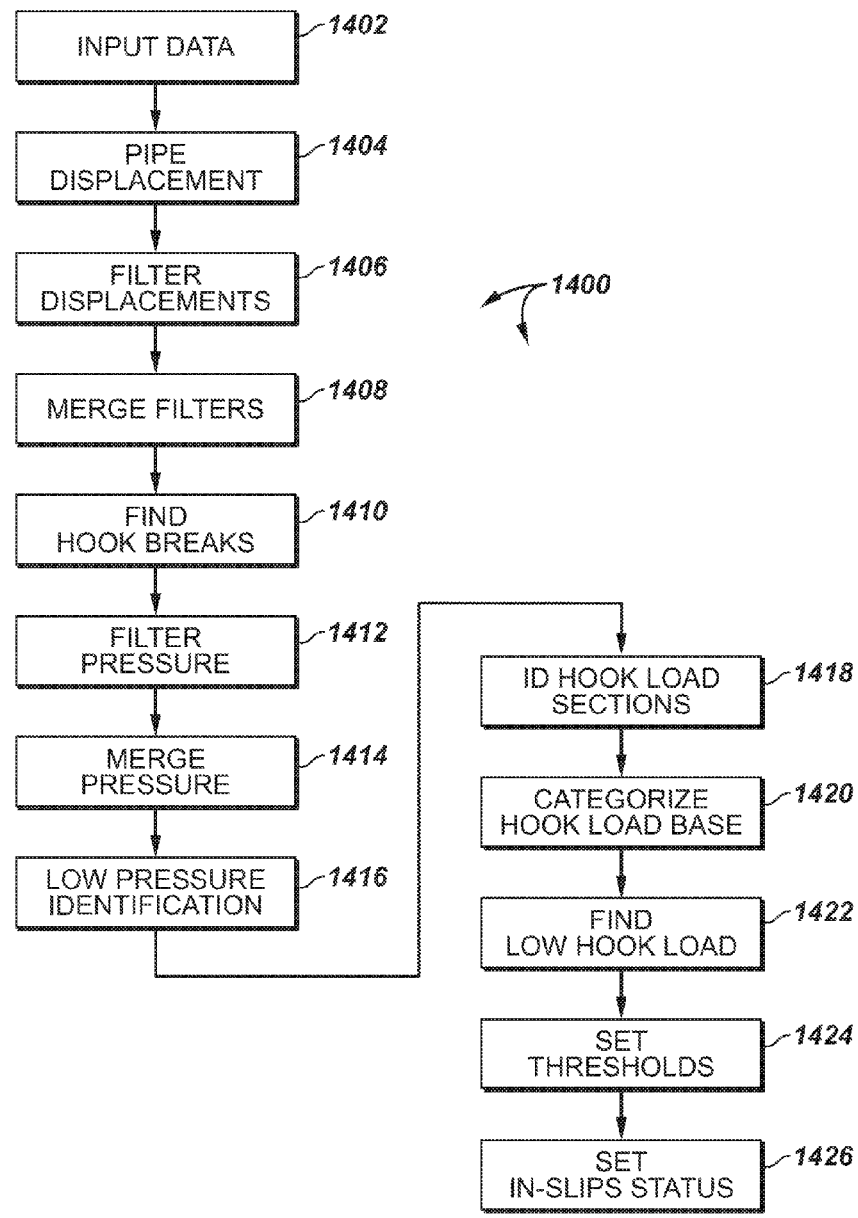

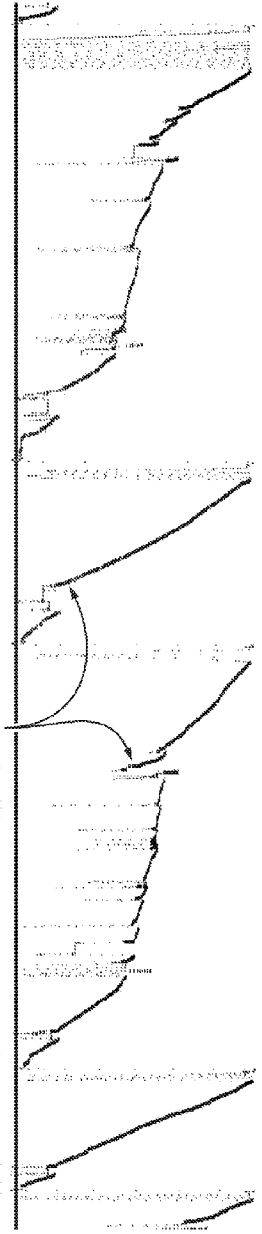

DETERMINING DRILL STRING STATUS IN A WELLBORE

CROSS REFERENCE TO RELATED APPLICATIONS

This application claims the benefit of and priority to U.S. Provisional Application Ser. No. 61/559,536 filed Nov. 14, 2011, entitled "Automatic Determination of In-Slips and On-Bottom with Automatic Dynamic Hookload Thresholds," to Castel et al., which expired after the filing of the present application, the disclosure of which is incorporated by reference herein in its entirety.

BACKGROUND

Generally, aspects of the disclosure relate to the drilling of geological formations. More specifically, aspects relate to methods and apparatus for automatic detection of in-slips and on-bottom status for drill strings.

Drilling of geotechnical stratum can be a difficult undertaking under certain conditions. As is well known, geotechnical stratum can range from clay stratum to rock formations and, as a result, a large amount of variability is present during drilling operations. The large amounts of variability in sub-surface stratum pose risks for drill rig operators. These risks include worker safety risks from breaking equipment to financial risks for missing target objectives during drilling. Operators are constantly looking to mitigate such risks to obtain better return on investment and increase worker safety.

To minimize these risks, operators attempt to monitor down-hole conditions to predict what is occurring while drilling. For example, operators monitor hookload thresholds and use these thresholds to determine when sections of drill pipe are inserted into the drill string. Operators manually program computer equipment to create breakpoints to allow operators to keep track of "in-slips" conditions of drill string components while drilling. Manual input of data is time consuming and allows for the possibility of human error.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A method for determining a status of a drill string in a wellbore is disclosed. The method can include obtaining pressure data and hook load data for the drill string. The pressure data can be filtered to obtain pressure sections. A low pressure threshold can be determined based upon the pressure sections. The hook load data can be filtered to obtain hook load sections. Hook load baselines can be determined based upon the hook load sections. Dynamic thresholds can be determined based upon the hook load baselines. An in-slips status of the drill string can be determined based upon the low pressure threshold, the dynamic thresholds, or both.

In another embodiment, the method can include obtaining pressure data and hook load data for the drill string. The pressure data can be filtered in two directions to obtain forward and backward pressure sections. The forward and backward pressure sections can be merged to obtain merged pressure sections. A low pressure threshold can be determined based upon the merged pressure sections. The hook load data can be filtered in two directions to obtain forward and backward hook load sections. The forward and backward hook load sections can be merged to obtain merged hook load sections. Hook load baselines can be determined based upon the merged hook load sections. Dynamic thresholds can be determined based upon the hook load baselines. An in-slips status of the drill string can be determined based upon the low pressure threshold, the dynamic thresholds, or both.

A computer readable medium for determining a status of a drill string in a wellbore is also disclosed. The computer readable medium can obtain pressure data and hook load data for the drill string. The pressure data can be filtered to obtain pressure sections. A low pressure threshold can be determined based upon the pressure sections. The hook load data can be filtered to obtain hook load sections. Hook load baselines can be determined based upon the hook load sections. Dynamic thresholds can be determined based upon the hook load baselines. An in-slips status of the drill string can be determined based upon the low pressure threshold, the dynamic thresholds, or both.

BRIEF DESCRIPTION OF THE DRAWINGS

FIG. 1-2 depicts an illustrative graph of four data channels used for input data, namely block position, hook load, torque, and pressure, according to one or more embodiments disclosed.

FIG. 2 depicts an illustrative graph indicating fast pipe displacements, according to one or more embodiments disclosed.

FIG. 11 depicts an illustrative graph showing deduction of low hook load sections, according to one or more embodiments disclosed.

FIG. 12 depicts an illustrative graph setting hook load dynamic thresholds, according to one or more embodiments disclosed.

FIG. 14 depicts an illustrative graph of the detailed methodology presented in FIGS. 1-2 to 13, according to one or more embodiments disclosed.

FIG. 20 depicts an illustrative graph indicating removal of slow slopes that are above the extended slow slopes in FIG. 19, according to one or more embodiments disclosed.

FIG. 21 depicts an illustrative graph of reconstructed slow slopes previously deleted wherein the slopes are actually on the bottom, according to one or more embodiments disclosed.

DETAILED DESCRIPTION

Figure 1:
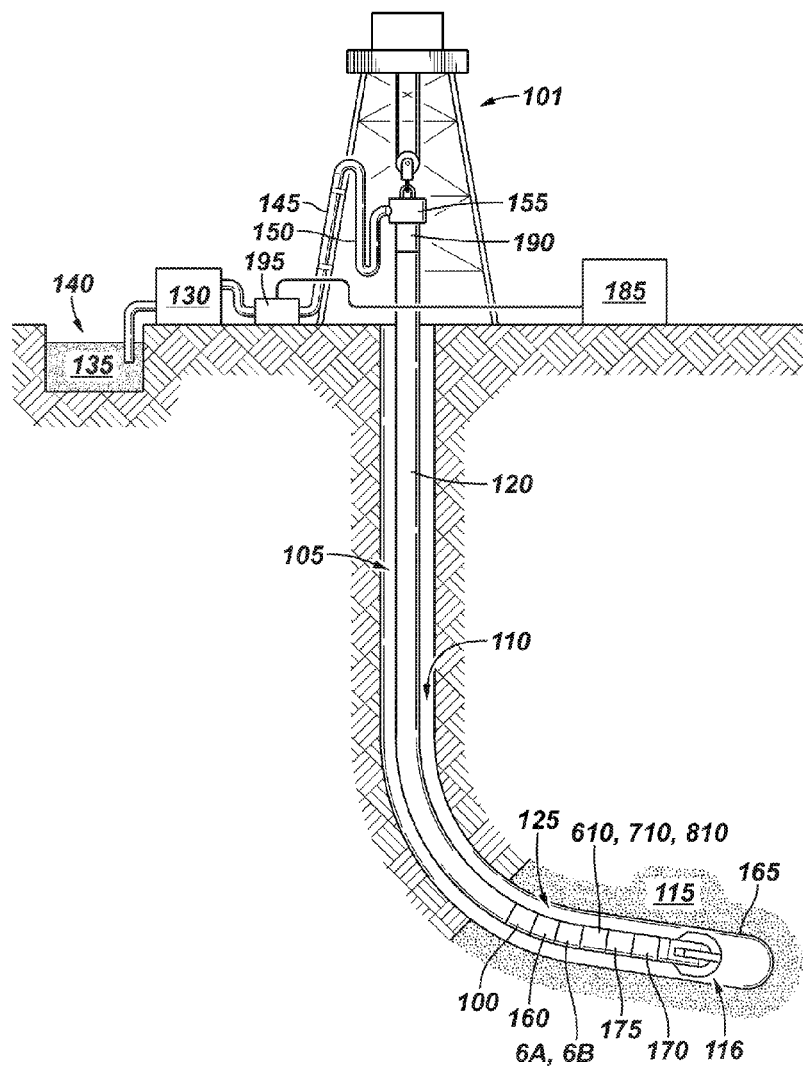
FIG. 1-1 depicts an illustrative well-drilling apparatus, according to one or more embodiments disclosed.

It will be understood that the following disclosure provides many different embodiments, or examples, for implementing different features of various embodiments. Specific examples of components and arrangements are described below to simplify the present disclosure. These are, of course, merely examples and are not intended to be limiting. In addition, this disclosure may repeat reference numerals and/or letters in the various examples. This repetition is for the purpose of simplicity and clarity and does not itself dictate a relationship between the various embodiments and/or configurations discussed. Moreover, the subterranean formation of a first feature over or on a second feature in the description can include embodiments in which the first and second features are formed in direct contact, and can also include embodiments in which additional features can be formed interposing the first and second features, such that the first and second features may not be in direct contact.

In accordance with the present disclosure, a well site with associated wellbore and apparatus is described in order to describe an embodiment of the application. To that end, an apparatus at the well site can be altered due to field considerations encountered.

FIG. 1-1 depicts an illustrative well-drilling apparatus, according to one or more embodiments. A drill string 105 can extend from a drill rig 101 into a zone of the formation of reservoir 115. The drill string 105 employs a telemetry system 100 for transmitting data from downhole to the surface. In the illustrated embodiment, the telemetry system 100 is a mud pulse telemetry system. Although illustrated with a mud pulse telemetry, the drill string 105 can use any type of telemetry system or any combination of telemetry systems, such as electromagnetic, acoustic, and/or wired drill pipe. A bottom hole assembly ("BHA") is suspended at the end of the drill string 105. In an embodiment, the bottom hole assembly includes one or more measurement and/or logging tools 125. For example, the bottom hole assembly can include a measurement while drilling ("MWD") tool, a logging while drilling ("LWD) tool, a formation pressure while drilling ("FPWD") tool, a formation evaluation tool, a formation sampling tool, and/or any other tool capable of measuring a characteristic of the subterranean formation and/or the reservoir 115, as shown by numerals 6a and 6b.

Logging while drilling tools used at the end of the drill string 105 can include a thick walled housing, commonly referred to as a drill collar, and can include one or more of a number of logging devices. The logging while drilling tool can be capable of measuring, processing, and/or storing information therein, as well as communicating with equipment disposed at the surface of the well site.

Measurement while drilling tools can include one or more of the following measuring tools: a modulator, a weight on bit measuring device, a torque measuring device, a vibration measuring device, a shock measuring device, a stick-slip measuring device, a direction measuring device, and inclination measuring device, and/or any other device.

Measurements obtained by the bottom hole assembly or other tools and sensors coupled to the drill string 105 can be transmitted to a surface computer or computing system 185 for analysis. For example, mud pulses can be used to transmit formation measurements performed by one or more of the downhole tools 6a and 6b to the computing system 185.

The computing system 185 is configured to host a plurality of models, such as a reservoir model, and to acquire and process data from downhole components, as well as determine the bottom hole location in the reservoir 115 from measurement while drilling data. Examples of reservoir models and cross well interference testing can be found in the following references: "Interpreting an RFT-Measured Pulse Test with a Three-Dimensional Simulator" by Lasseter, T., Karakas, M., and Schweltzer, J., SPE 14878, March 1988; "Design, Implementation, and Interpretation of a Three-Dimensional Well Test in the Cormorant Field, North Sea" by Bunn, G. F., and Yaxley, L. M., SPE 15858, October 1986; "Layer Pulse Testing Using a Wireline Formation Tester" by Saeedi, J., and Standen, E., SPE 16803, September 1987; "Distributed Pressure Measurements Allow Early Quantification of Reservoir Dynamics in the Jene Field" by Bunn, G. F., Wittman, M. J., Morgan, W. D., and Curnutt, R. C., SPE 17682, March 1991; "A Field Example of Interference Testing Across a Partially Communicating Fault" by Yaxley, L. M., and Blaymires, J. M., SPE 19306, 1989; and "Interpretation of a Pulse Test in a Layered Reservoir" by Kaneda, R., Saeedi, J., and Ayestaran, L. C., SPE 19306, December 1991.

The drill rig 101 or a similar device can be used to move the drill string 105 within the well that is being drilled through subterranean formations of the reservoir 115. The drill string 105 can be extended into the subterranean formations with a number of coupled drill pipes 120 of the drill string 105. An illustrative drill pipe 120 is shown and described in U.S. Pat. No. 6,174,001, entitled "Two-Step, a Low Torque, Wedge Thread for Tubular Connector," which issued Aug. 7, 2001, to Enderle, which is incorporated herein by reference in its entirety.

Several of the components disposed proximate to the drill rig 101 can be used to operate components of the overall system. These components will be explained with respect to their uses in drilling the well 110 for a better understanding thereof. The drill string 105 can be used to turn and urge a drill bit 116 into the bottom the well 110 to increase the length (depth) of the well 110. During drilling of the well 110, a pump 130 lifts drilling fluid (mud) 135 from a tank 140 or pits and discharges the mud 135 under pressure through a standpipe 145 and flexible conduit 150 or hose, through a top drive 155 and into an interior passage inside the drill string 105. The mud 135, which can be water or oil-based, exits the drill string 105 through courses or nozzles (not shown) in the drill bit 116, and the mud cools and lubricates the drill bit 116 and lifts drill cuttings generated by the drill bit 116 to the surface of the Earth through an annular arrangement.

When the well 110 has been drilled to a selected depth, the well logging tools 125 can be positioned at the lower end of the drill string 105 if not previously installed. The well logging tools 125 can be positioned downhole by pumping the well logging tools 125 down the drill string 105 or otherwise moving the well logging downhole tools 125 down the drill string 105 while the drill string 105 is within the well 110. The well logging tools 125 can then be coupled to an adapter sub 160 at the end of the drill string 105 and can be moved through, for example, a highly inclined portion 165 of the well 110, which can be inaccessible using armored electrical cable to move the well logging tools 125.

During well logging operations, the pump 130 can be operated to provide fluid flow to operate one or more turbines in the well logging tools 125 to provide power to operate certain devices in the well logging tools 125. When tripping in or out of the well 110 (turning on and off the mud pumps 130), it can be unfeasible to provide fluid flow. As a result, power can be provided to the well logging tools 125 in other ways. For example, batteries can be used to provide power to the well logging downhole tools 125. In one embodiment, the batteries can be rechargeable batteries and can be recharged by turbines during fluid flow. The batteries can be positioned within the housing of one or more of the well logging tools 125. Other configurations and methods of powering the well logging tools 125 can be used including, but not limited to, one-time power-use batteries.

As the well logging tools 125 are moved along the well 110 by moving the drill pipe 105, signals can be detected by various devices or sensors, of which non-limiting examples can include a resistivity measurement device, a bulk density measurement device, a porosity measurement device, a formation capture cross-section measurement device 170, a gamma ray measurement device 175, and a formation fluid sampling tool 610, 710, 810 which can include a formation pressure measurement device 6a and/or 6b. The signals can be transmitted toward the surface of the Earth along the drill string 105.

An apparatus and system for communicating from the drill string 105 to the computing system 185 or other component configured to receive, analyze, and/or transmit data can include a second adapter sub 190 that can be coupled between an end of the drill string 105 and the top drive 155. The second adapter sub 190 can be used to provide a communication channel with a receiving unit 195 for signals received from the well logging downhole tools 125. The receiving unit 195 can be coupled to the computing system 185 to provide a data path therebetween that can be a bidirectional data path.

Though not shown, the drill string 105 can be connected to a rotary table, via a Kelly, and can suspend from a traveling block or hook, and additionally a rotary swivel. The rotary swivel can be suspended from the drilling rig 101 through the hook, and the Kelly can be connected to the rotary swivel such that the Kelly can rotate with respect to the rotary swivel. The Kelly can be or include any configuration having a set of polygonal connections or splines on the outer surface type that mate to a Kelly bushing such that actuation of the rotary table can rotate the Kelly.

An upper end of the drill string 105 can be connected to the Kelly, such as by threadably reconnecting the drill string 105 to the Kelly, and the rotary table can rotate the Kelly, thereby rotating the drill string 105 connected thereto.

Although not shown, the drill string 105 can include one or more stabilizing collars. A stabilizing collar can be disposed within or connected to the drill string 105, in which the stabilizing collar can be used to engage and apply a force against the wall of the well 110. This can enable the stabilizing collar to prevent the drill pipe string 105 from deviating from the desired direction for the well 110. For example, during drilling, the drill string 105 can "wobble" within the well 110, thereby allowing the drill string 105 to deviate from the desired direction of the well 110. This wobble action can also be detrimental to the drill string 105, components disposed therein, and the drill bit 116 connected thereto. A stabilizing collar can be used to minimize, if not overcome altogether, the wobble action of the drill string 105, thereby possibly increasing the efficiency of the drilling performed at the well site and/or increasing the overall life of the components at the well site.

As will be understood, terminology used herein is used consistently with those in oilfield drilling industrial applications. As used herein, the term "slips" refers to a device that is used to grip the drill string in a relatively non-damaging manner This device can include three or more steel wedges that are hinged together forming a near circle around the drill pipe 120. On the drill pipe side (inside surface of the slips), the slips are fitted with replaceable hardened tool steel teeth that embed slightly into the side of the drill pipe 120 when the slips are activated. The outsides of the slips are tapered to match the taper of the rotary table. After the rig crew places the slips around the drill pipe 120 and in the rotary table, the driller can slowly lower the drill string 105. As the teeth on the inside of the slips grip the pipe 120, the slips are pulled down. This downward force pulls the outer wedges down providing a compressive force inward on the drill pipe 120 and effectively locking everything together. Then, the rig crew can unscrew the upper portion of the drill string 105 (above the slips) while the lower part is suspended due to the mechanical action of the slips. After another component is screwed onto the drill string 105, the driller raises the drill string 105 to unlock the gripping action of the slips and the rig crew removes the slips from the rotary. Thus, the term "in-slips" is reflective of a drill string 105 that is being encompassed by a slips mechanism, as described above. The term "out-of-slips" reflects times when the drill string 105 is not confined by a slips mechanism.

In addition, as used herein, "stand" refers to two or three single joints of drill pipe 120 or drill collars that remain screwed together during tripping operations. In some embodiments, four or more joints or sections can be used. In some embodiments, deep capacity drilling rigs handle three joint stands, called "triples." Some smaller rigs have the capacity for two joint stands called "doubles." In each case, the drill pipe collars are stood back up right in the derrick and placed into finger boards to keep them orderly. This is a relatively efficient way to remove the drill string 105 from the well 110 when changing the bit or making adjustments to the bottom hole assembly rather than unscrewing the threaded connection and laying the pipe down to a horizontal position.

As used herein, "standpipe" refers to a rigid metal conduit that provides the high-pressure pathway for drilling mud to travel approximately ⅓ of the way up the derrick where it connects to a flexible high-pressure hose. Many large rigs, for example, are fitted with dual standpipes so that downtime is kept to a minimum if one standpipe is being repaired.

As used herein, "tripping" refers to the act of pulling the drill string 105 out of the borehole or running it into the borehole. A pipe trip, for example, is oftentimes done because the drill bit 116 has dulled or has otherwise ceased to drill efficiently, at which point it is replaced.

Figures 1, 2:
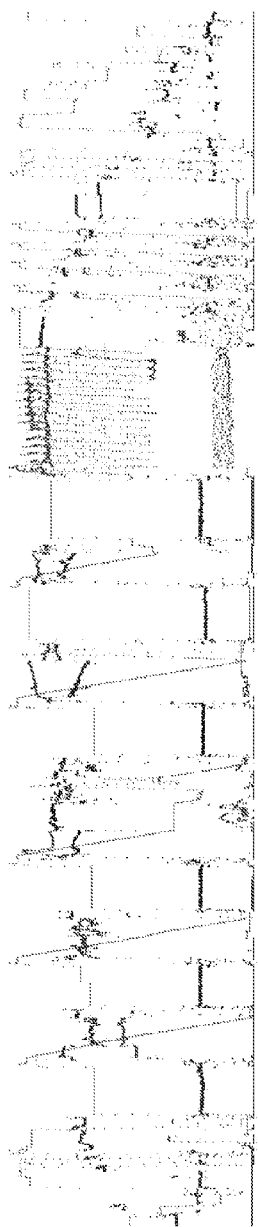
Figure 2:
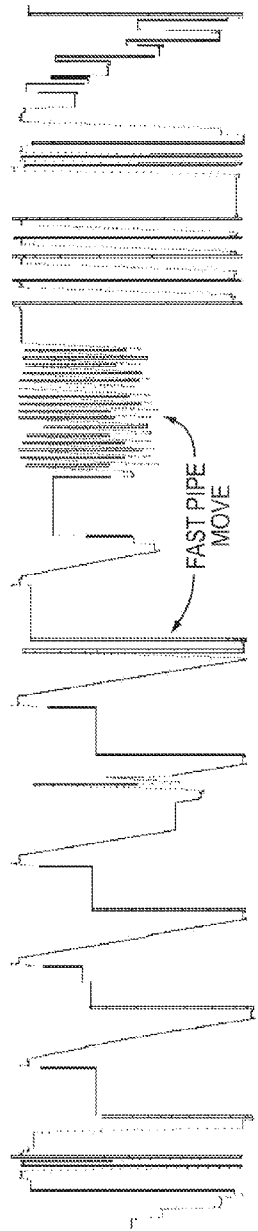

FIG. 1-2 depicts an illustrative graph of four data channels used for input data, namely block position, hook load, torque, and pressure, according to one or more embodiments. Block position, hook load, torque, and pressure are four distinct channels of data that are obtained during drilling operations. Data relating to block position refers to the vertical position of an assembly of pulleys/sheaves on a common framework. The value of hook load is the amount of force exposed on the hook below the assembly of pulleys/sheaves. Strain transducers on the sheave mechanisms or cables, for example, can be used to determine the overall loading on the hook. The hook, as described, is used to lift objects, such as drill pipes 120, during installation of such units during drilling activities extending the wellbore. Torque values are those values that the drill string 105 is exhibiting during rotary operation in the wellbore. Wellbore resistance to rotary drilling uses more torque through the rotary driving mechanism (such as the Kelly) during drilling. Wellbore resistance to rotary drilling can be obtained from the type of geotechnical stratum being drilled, hydration levels of the subsurface materials and wellbore size, as non-limiting factors. Pressure values are from pressure inside the standpipe 145 of the wellbore being drilled. Such pressure values can be obtained from pressure transducers placed within the standpipe 145.

FIG. 2 depicts an illustrative graph for indicating "fast" pipe displacements, according to one or more embodiments. With the data (information) obtained from the various sensors configured to obtain such information, as described above, pipe displacements can be determined Pipe displacements refer to movement of drill string sections, generally in the vertical direction. The pipe movements can be graphed over time, as shown in FIG. 2. Pipe movements can be characterized as "slow" or proceeding in a normal progression as during drilling operations or "fast" such as during other procedures occurring during drilling, such as replacement/placement of drillpipe 120 in the drill string 105. A computer system, for example, can be used to track the vertical motion of the relative sections of the drill string 105 along the vertical path being traveled. As the sections of drill string 105 being added are consistent, the amount of motion, generally, is consistent. Note that FIG. 2 provides tracks of "fast" pipe displacements. While drilling occurs, vertical progress of the drill string 105 occurs, but this progression is defined as "slow" as the vertical progression is much slower compared to when the drill string 105 is placed within slips and manipulated by rig operators (i.e., "fast" pipe displacement). As provided in FIG. 2, "fast" pipe movements are indicated by the sections which appear different than the other more consistent pipe displacement.

Figure 3:
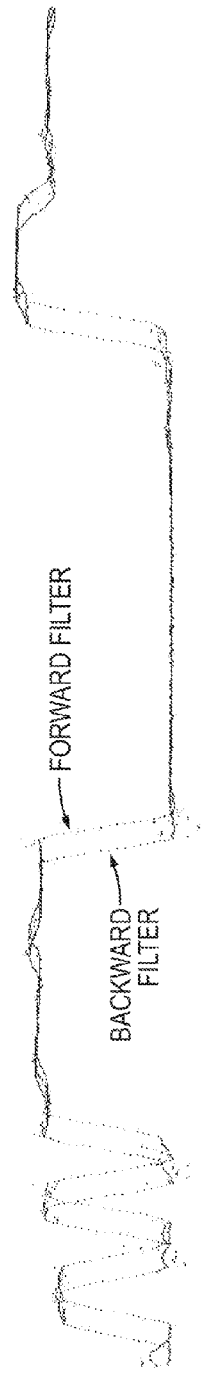
FIG. 3 depicts an illustrative graph of processed data for filtering hook load data, according to one or more embodiments disclosed.

FIG. 3 depicts an illustrative graph of processed data for filtering hook load data, according to one or more embodiments. Using a filtering algorithm, process data (hook load data) can be filtered along from a starting point to an ending point, at the discretion of the user. The user can be located at the rig site or can be remote from the rig. The user can also be "automated" such as a computer configured to track and controlling rig activities. The starting point can be at the start of monitoring drilling operations. The filtering algorithm can also be used to filter the data from the ending point backwards to the starting point, thus two filtering passes are conducted on the data. As a non-limiting embodiment, a Kaiser filtering algorithm can be used. The data that is filtered in a forward and backward manner is that data described in relation to FIG. 1-2, namely block position, hook load, torque, and pressure.

The data that is filtered can then be saved, for example, on a computer readable medium. Additionally, the data can be displayed for operators to note the results of the filtering algorithm.

Figure 4:
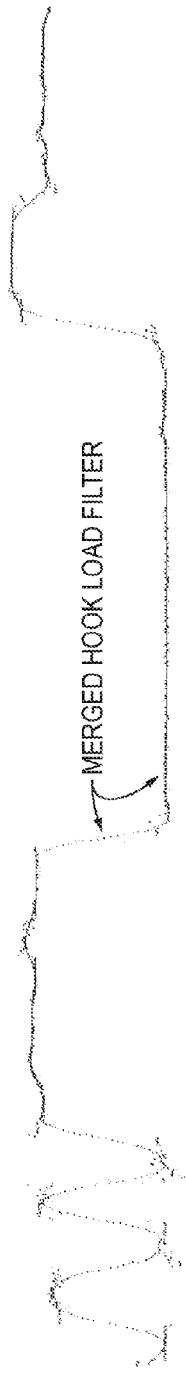
FIG. 4 depicts an illustrative graph of merged forward and backward filters for hook load data, according to one or more embodiments disclosed.

FIG. 4 depicts an illustrative graph of merged forward and backward filters for hook load data, according to one or more embodiments. The values from the forward and backward pass from FIG. 3 are summed to obtain a single plot of data for the hook load values obtained. The stored data, for example, can be used from the forward and backward passes that are accomplished from FIG. 3. As illustrated in FIG. 4, specific areas for a merged hook load filter are indicated by the arrows. The merged hook load filter data have a more "flattened" look smoothing out data perturbations. In the illustrated embodiment, the data plotted occurs on a time axis for representation. Combining data from the forward and backward passes can be accomplished through statistical relationships. Other methods of combining data can also be performed. Additionally, data can be used from forward passes, backward passes, or a combination of forward and backward passes.

Figure 5:
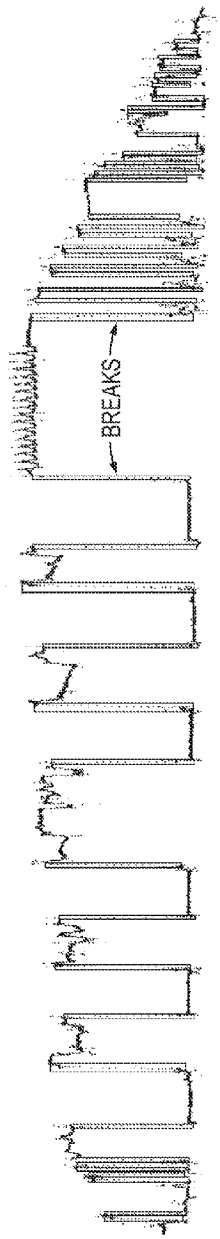
FIG. 5 depicts an illustrative graph indicating locations of hook load breaks greater than a predetermined size, according to one or more embodiments disclosed.

FIG. 5 depicts an illustrative graph indicating locations of hook load breaks greater than a predetermined size, according to one or more embodiments. The merged hook load filter assists in finding breaks in the data from FIG. 4. An algorithm analyzes the data from FIG. 4 and determines where breaks in data occur. It should be noted, however, that some breaks that are discovered are not greater than the predetermined size. Some breaks, for example, are too "small" compared with surrounding breaks. These breaks are less than the predetermined size and, as such, are subsequently removed from further consideration and further analysis. The result is that the remaining data pertains to those breaks whose variation is more likely to be related to total weight experienced. As will be apparent, breaks resulting from total weight changes can be more relevant than other breaks encountered, through, for instance, data discontinuities or temporary operator actions that affect the overall data stream.

Figure 6:
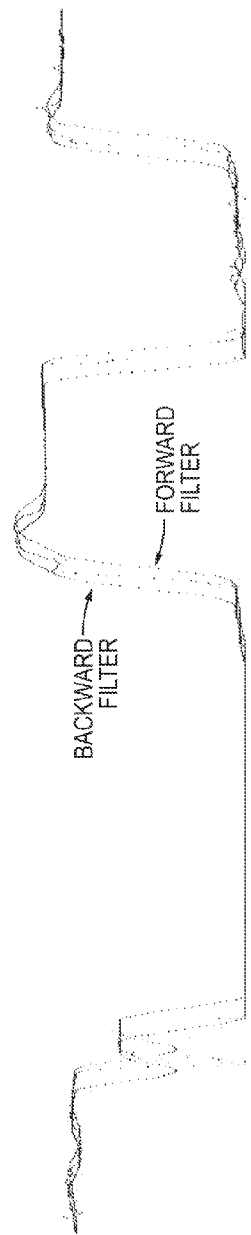
FIG. 6 depicts an illustrative graph of filtered pressure from within a borehole, according to one or more embodiments disclosed.

FIG. 6 depicts an illustrative graph of filtered pressure from within a borehole, according to one or more embodiments. Referring to FIG. 6, pressure data from within the standpipe 145 is processed. A filter is used on the pressure data to obtain a set of resultant pressure values. The filter is used from a starting point to the ending point. A second filtering can also be performed from the ending point to the starting point. The filter, in the illustrated embodiment, is a Kaiser filtering algorithm as described previously and filters the entire data stream from starting to ending point and then from ending point to starting point. The Kaiser filtering algorithm can perform mathematical operations on a discrete time interval to enhance aspects of the signal. Such analysis with the Kaiser filtering algorithm can be conducted by an analog to digital converter, which is configured to sample the input data. The converter can be part of a microprocessor configured to implement the preset series of instructions for incoming data. In specific applications, field programmable gate arrays "FPGA's" or application specific integrated circuits "ASIC's" can be used, as opposed to a more general purpose microprocessor in each aspect where processing is disclosed. Such circuits can accomplish their objectives either uphole or downhole. For example, the objectives can be accomplished on a computer operated by rig operators at the surface. The mathematical operations described can be accomplished with the same system or separate systems can be used to provide for redundant calculation capability.

Figure 7:
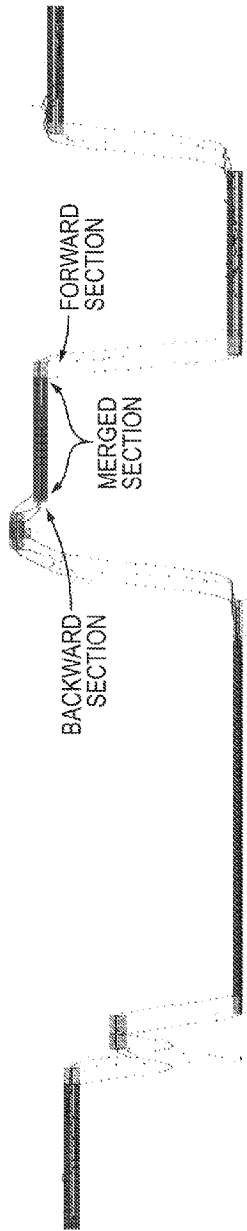
FIG. 7 depicts an illustrative graph of identification of forward and backward pressure sections and subsequent merger of these values, according to one or more embodiments disclosed.

FIG. 7 depicts an illustrative graph of identification of forward and backward pressure sections and subsequent merger of these values, according to one or more embodiments. Using the forward and backward pressure filtering operation in FIG. 6, horizontal sections of pressure corresponding to both the forward and backward filters are found. These values can be merged so that they are centered on the data and also have maximum extension. As illustrated in FIG. 7, the backward section is identified by an arrow. The forward section is also identified by an arrow. The start and end of the merged section are further noted by arrows.

Figure 8:
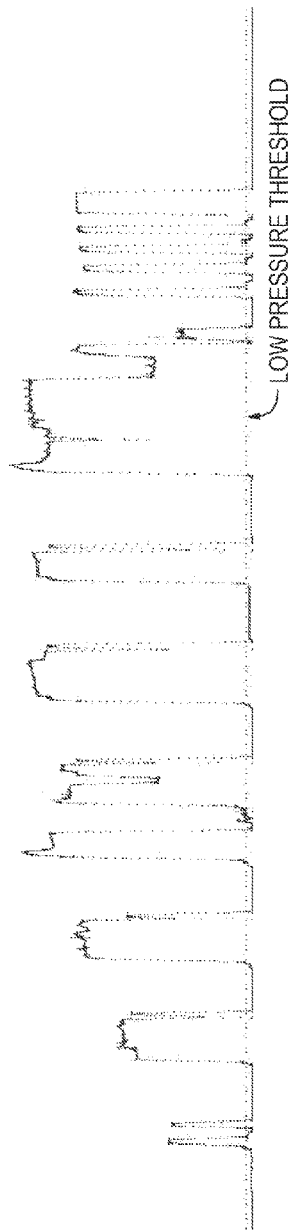
FIG. 8 depicts an illustrative graph of pressure thresholds, where low pressure thresholds are identified, according to one or more embodiments disclosed.

FIG. 8 depicts an illustrative graph of pressure thresholds, where low pressure thresholds are identified, according to one or more embodiments. Referring to FIG. 8, identification of a low pressure threshold is performed. By sorting horizontal pressure sections as well as detecting inflection points, a low pressure threshold is set as identified by the noted arrows.

Figure 9:
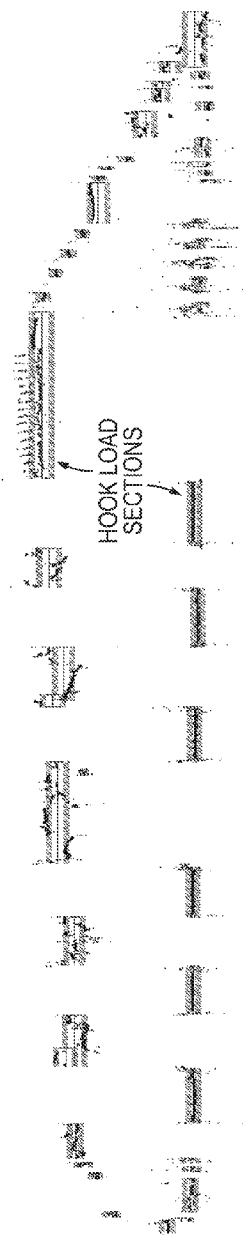
FIG. 9 depicts an illustrative graph identifying hook load sections, according to one or more embodiments disclosed.

FIG. 9 depicts an illustrative graph identifying hook load sections, according to one or more embodiments. Similar to previously provided pressure sections described above in FIG. 8, hook load sections are identified for future processing. Illustrative hook load sections are identified by the arrows. It can be seen, for example, in FIG. 9, that a large or "elongated" section of hook load is presented, indicating times at which high loads are placed upon the hook of the rig.

Figure 10:
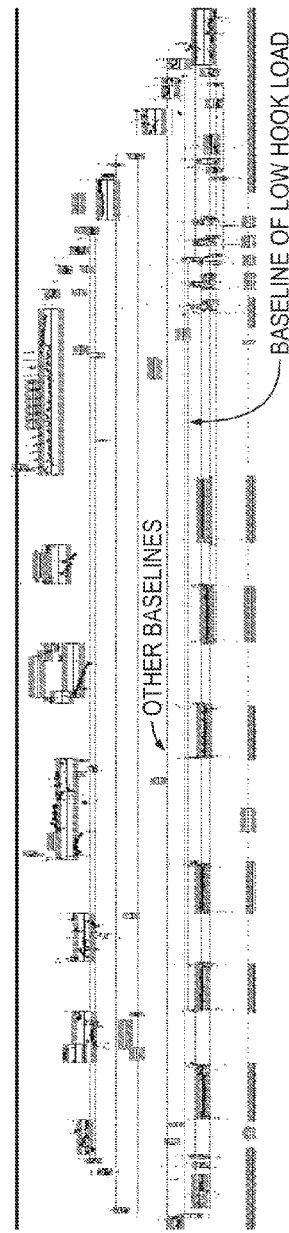
FIG. 10 depicts an illustrative graph of a hook load baseline, according to one or more embodiments disclosed.

FIG. 10 depicts an illustrative graph of a hook load baseline, according to one or more embodiments. Hook load sections are sorted and inflection points found, in order to assemble the hook load sections into baselines of approximately equal block position height in order to find hook load baselines. These baselines are then separated into highly probable low hook load and other baselines using second derivatives, break ups, pressure, and pipe intersections. In one non-limiting embodiment, because some rigs allowing pumping while disconnected or perform operations when pressure measurements are not available, pressure data is not used as the pressure data is not indicative of in-slips conditions. In FIG. 10, other baseline data is noted in the series of data. Additionally, a baseline of low hook load is noted in the series of data.

FIG. 11 depicts an illustrative graph showing deduction of low hook load sections, according to one or more embodiments. Based on highly probable low hook load baselines (as found in FIG. 10), the method extends low section status to sections belonging to low hook load baselines and also to other sections with similar properties regarding block position, pipe movements, breaks, pattern, and location.

FIG. 12 depicts an illustrative graph setting hook load dynamic thresholds, according to one or more embodiments. Referring to FIG. 12, if baselines have been found, as in FIG. 11, dynamic thresholds are set between individual hook load sections by threading between low hook load sections and sections above them. Additionally, dynamic thresholds are set inside low hook load sections by using breaks surrounding the section and included to account for variations of hook load characteristics while "in-slips." As illustrated, dynamic hook load threshold threading between hook load sections is presented.

Figure 13:
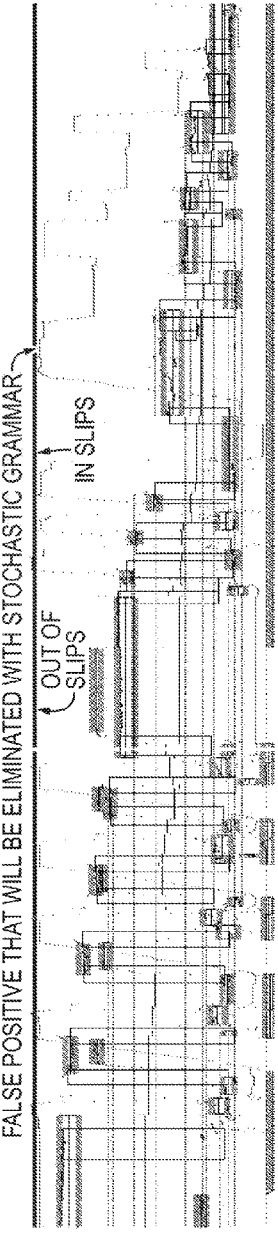
FIG. 13 depicts an illustrative graph showing set in-slips status based on dynamic thresholds, according to one or more embodiments disclosed.

FIG. 13 depicts an illustrative graph showing set in-slips status based on dynamic thresholds, according to one or more embodiments. Referring to FIG. 13, "in-slips" status is determined using dynamic thresholds (i.e., moving thresholds) as well as block movements, interval size and pressure, to set "in-slips" status. False positives can also be presented, such as a case where "in- slips" are triggered by the stand pipe not actually "in-slips." These cases can be removed using a stochastic grammar.

FIG. 14 depicts an illustrative graph of the detailed methodology presented in FIGS. 1-2 to 13, according to one or more embodiments. Referring to FIG. 14, a method 1400 used to determine a drilling status is provided. Data is input into a computer system at 1402, as explained above in relation to FIG. 1-2. The data can be related to various features and measured components of a geotechnical formation that is undergoing drilling. Pipe displacements are obtained for the drill string being used to perform the drilling at 1404, as explained in relation to FIG. 2. Pipe displacements can be from movement or insertion of pipes into the pipe string and subsequent tracking of the overall motion of the individual pipe strings. The pipe displacements obtained at 1404 are filtered at 1406, as illustrated and described in relation to FIG. 3. The filtering occurs in a forward progression as well as a backward progression between a starting and ending point. An empirically generated filter can be used for performing the task. The filter can be fine tuned, by operators, during operations to allow for greater or lesser tracking capability. The results obtained at 1406 for the filtration are merged at 1408, as illustrated and described in relation to FIG. 4. Hook breaks are determined from data that is obtained at 1410, as illustrated and described in relation to FIG. 5. Pressure values are obtained and filtered at 1412, as illustrated and described in relation to FIG. 6. The filtration of the pressure data can be similar to that provided at 1406. Pressure values are merged from both the forward and backward passes for filtration of the data at 1414, as illustrated and described in relation to FIG. 7. Next, low-pressure identification is performed at 1416, as illustrated and described in relation to FIG. 8. Hook load sections are identified at 1418, as illustrated and described in relation to FIG. 9. A hook load base is categorized at 1420, as illustrated in FIG. 10. A low value for a hook load is determined at 1422, as illustrated and described in relation to FIG. 11. Thresholds are set at 1424, as illustrated in FIG. 12. Lastly, in-slips status is set/determined at 1426, as illustrated in FIG. 13.

Figure 15:
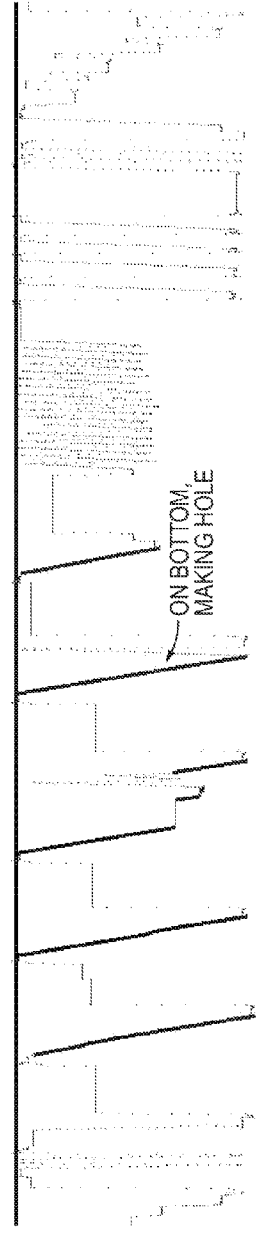
FIG. 15 depicts an illustrative graph of results of automatic on-bottom detection, according to one or more embodiments disclosed

FIG. 15 depicts an illustrative graph of results of automatic on-bottom detection, according to one or more embodiments. In the illustrated graph, on-bottom status is noted through the arrow noting on-bottom status and the performance of making a hole. In this illustrated embodiment, "on-bottom" status is noted in the fourth line from the left.

Figure 16:
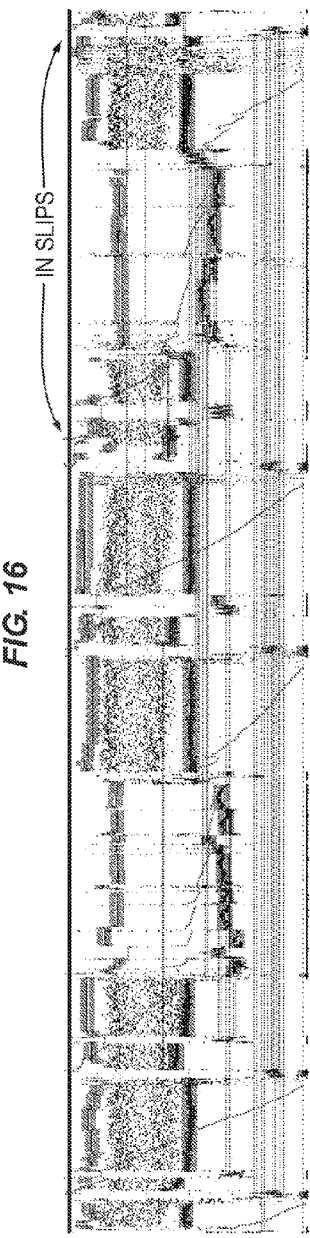
FIG. 16 depicts an illustrative graph of partitioning of a project using in-slip detection described in FIGS. 1-2 to 13 and out of slips sections, according to one or more embodiments disclosed.

FIG. 16 depicts an illustrative graph of partitioning of a project using in-slip detection described in FIGS. 1-2 to 13 and out of slips sections, according to one or more embodiments. Determining on-bottom status can be accomplished through using the method provided in FIG. 14 to determine "in-slips" conditions and out-of-slips conditions. In-slips sections are noted through the arrows presented. The project, in fact, can be partitioned using in-slips and out-of-slips sections. In-slips sections are noted on the right side of the graphed data.

Figure 17:
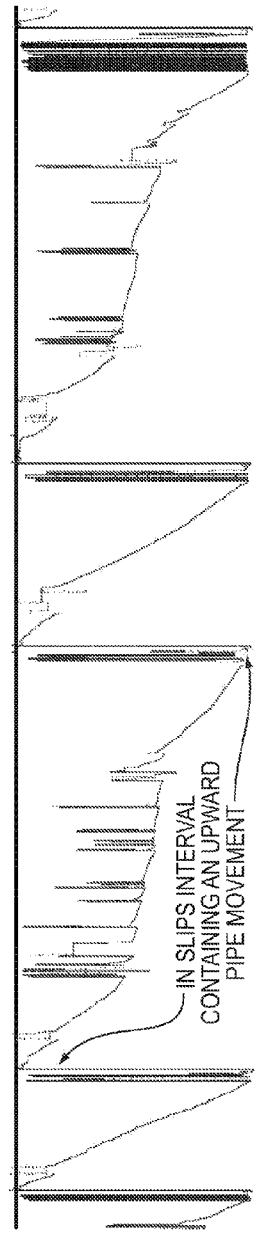
FIG. 17 depicts an illustrative graph considering out-slips interval that follow an in-slips interval, according to one or more embodiments disclosed.

FIG. 17 depicts an illustrative graph considering out-slips interval that follow an in-slips interval, according to one or more embodiments. Out-slips intervals are considered following in-slips intervals with an upward pipe movement, thus, as explained above, the drill string is "locked in" for rotary motion. In this illustrated embodiment, if an in-slips section has been used to add a stand, for example a drill pipe section is being added, it is possible that it starts a sequence for making a hole. To evaluate if a slip section adds or removes stand pipes, the entry and exit points of an in-slips sections are evaluated in addition to observing actual pipe movements while in-slips.

Figure 18:
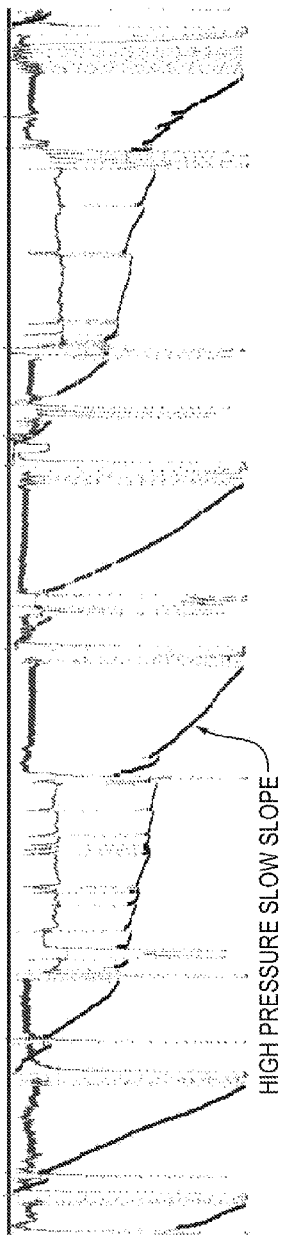
FIG. 18 depicts an illustrative graph identifying a continuous slow pipe movement, according to one or more embodiments disclosed.

FIG. 18 depicts an illustrative graph identifying a continuous slow pipe movement, according to one or more embodiments. Identification of slow pipe movements can be used to determine when a borehole is being drilled through rotary action of the drill rig. This identification considers both the slope and the block movement that is slowly progressing downward, and the pressure present as well as the in-slips indicators. In the illustrated embodiment, a high pressure slope is noted in the central portion of the graph.

Figure 19:
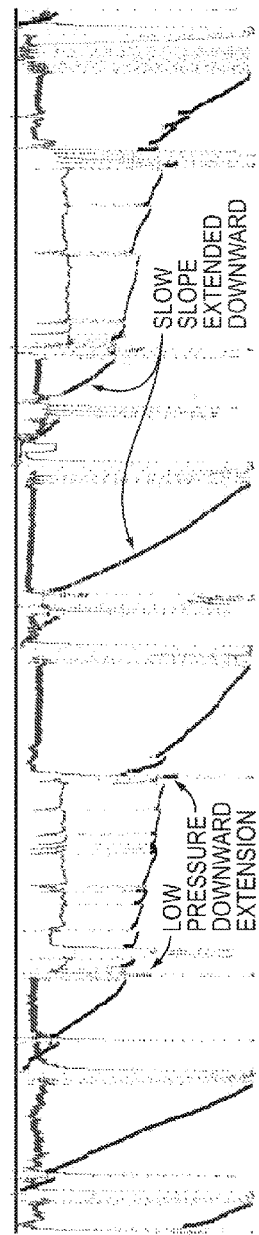
FIG. 19 depicts an illustrative graph identifying slow slopes extended downward, according to one or more embodiments disclosed.

FIG. 19 depicts an illustrative graph identifying slow slopes extended downward, according to one or more embodiments. The slow slopes in the graph are extended in a downward motion corresponding to pipe string contractions that make the pipe string appear at the surface as being lower than they are. These contractions are related to both the mechanics of the pipes and pressure.

FIG. 20 depicts an illustrative graph indicating removal of slow slopes that are above the extended slow slopes in FIG. 19, according to one or more embodiments. As previous slow slopes would indicate on-bottom status, subsequent slow slopes would seem to have to be lower. In actuality, there are instances where variations of lengths of pipe strings are possible, that are explained in further detailed later.

FIG. 21 depicts an illustrative graph of reconstructed slow slopes previously deleted where the slopes are actually on the bottom, according to one or more embodiments. By backtracking on-bottom slow slopes, the actual on-bottom points that appear otherwise because of previous contraction of the pipe string can be recovered. Notations of recovered slow slopes are presented in the graphs for easy identification. The illustrated embodiment uses a linear filter for backtracking. A curve fitting filter can be used.

Figure 22:
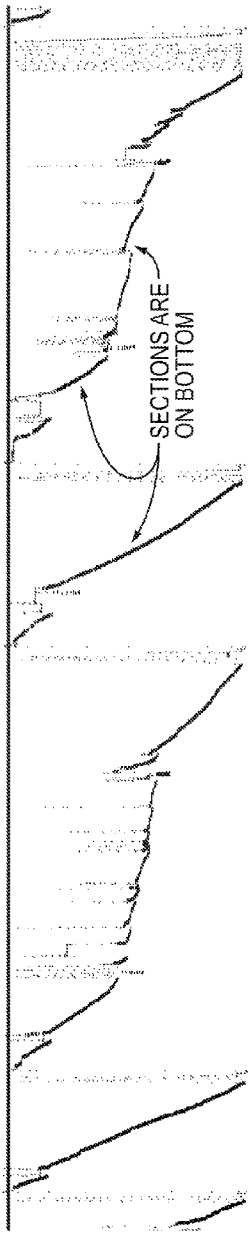
FIG. 22 depicts an illustrative graph of the final results of the data manipulations described in FIGS. 15-21, according to one or more embodiments disclosed.

FIG. 22 depicts an illustrative graph of the final results of the data manipulations described in FIGS. 15-21. Referring to FIG. 22, additional measures can be taken regarding keeping track of on-bottom status across in-slips intervals and constant on-bottom status intervals. FIG. 22 is an illustration of removal of a reaming sequence that would look like an on-bottom sequence but is removed on the basis that it is preceded by a lower block position point. The removal of the reaming sequence status is accomplished along the data points provided. Removed reaming sequences are highlighted in the data stream.

Figure 23:
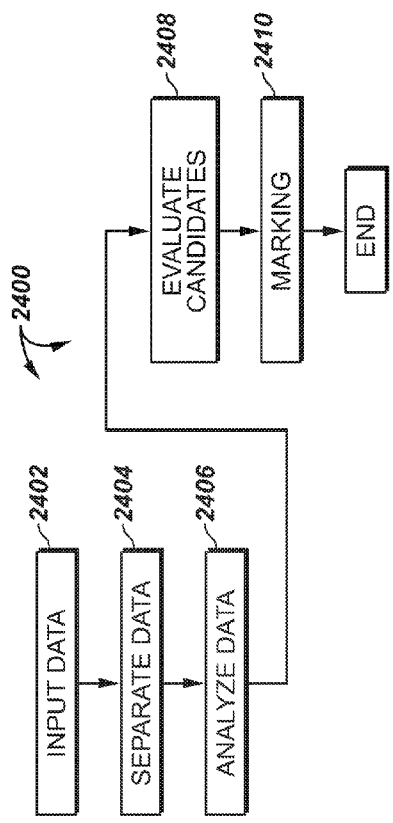
FIG. 23 depicts an illustrative flowchart of the method describing data manipulations in FIGS. 15-22, according to one or more embodiments disclosed.

FIG. 23 depicts an illustrative flowchart of the method 2400 describing data manipulations in FIGS. 15-22, according to one or more embodiments. Referring to FIG. 23, an example method 2400 is presented for conducting evaluation of on-bottom status. A series of data is provided for processing at 2402. The data is then separated at 2404 into in-slips status and out-of-slips sections, as provided above in relation to FIG. 1-2. For out-of-slips intervals, the data is analyzed to determine in-slips intervals coupled with upward pipe movement at 2406. For upward pipe movement, it can be determined that there is no on-bottom status. The data is also evaluated for slow pipe movements, and those slope pipe movements are identified as possible candidates for on-bottom status at 2408. Identification of slow slopes that are geometrically above previous slow slopes are identified and marked at 2410 and removed from consideration. In additional embodiments, slow slopes previously deleted, at 2410, are reconstructed and using a curve fitting filter, on bottom status can be determined.

As will be apparent to those skilled in the art, various computer arrangements can be used to effectuate the methods presented above in relation to join procedures described. To this end, a dedicated computer can be used at a well drilling site in order for the methods to be performed. In an additional embodiment, various portions of the methodology presented can be performed on a computer network and can be stored on various computers that are networked or interlinked together. The computers used can be remote computer systems that can be networked together.

The computers used can have different configurations to allow an operator to input and obtain information from the computer system. To this end, the computer can be designed to read and develop computer readable medium for implementation of instructions or preparation of data obtained during processing functions. When the computer readable medium is executed by a processor, the computer readable medium can control a method for determining the status of the drill string in the wellbore.

The computer readable medium can include a Universal serial bus (USB) computer readable medium, floppy disk, compact disc, or digital video disc mediums. The computer can be capable of reading non-transitory memory provided in various forms to the computer for analysis and processing.

Display of information can be performed through various arrangements. In non-limiting example embodiments, data can be printed out for an operator to review. In addition, visual representation of the data can occur. The representation can be in the form of graphs, numbers, or other representations. The display of the information by the computer system can be interlinked with other computer software arrangements such that the display is part of a suite of software functions that an operator can utilize while performing operations on the drill rig. Interconnection of the method and methodologies presented above can occur to allow the data to be utilized by other methods for greater efficiency of drill rig operator actions. Additionally, data can be stored after drilling has occurred to enable drill rig operators to fine tune future actions by identifying situations and areas of improvement for drilling based upon encountered geotechnical conditions.

The methods and apparatus illustrated provide the ability for operators to separate different tasks and ultimately make these tasks more efficient. To that end, separation of the tasks and subsequent processing can be accomplished by computers in a network arrangement. These computer network arrangements can be established through LAN connections, the Internet, Wi-Fi networks, wireless communication methods, and wired communication networks as non-limiting examples.

Input into the computer programs can be through direct connection of downhole tools, for example, to the computer to perform the functions. Operator inputs can be accomplished through keyboard, mouse, tablet, voice, scanning systems or USB, Firewire, or wireless networks, as non-limiting embodiments.

Output devices can be used to provide desired feedback on status to operators. Output devices that can be used include display monitors, such as LCD, CRT, projection or plasma. Output can also be provided to printers, such as laser, ink jet and dot matrix units. Output can also be done through audio devices, such as speakers or headphones.

Configurations presented allow for both one-way communication from downhole to uphole environments and two-way communication from uphole to downhole and downhole to uphole. Rig operators can make continuous decisions on geotechnical decisions to maximize rig efficiency. In another embodiment, rig operators can follow a plan that has been predefined during rig operations.

The ability to allow operators, for example, to determine on-bottom status or in-slips status can minimize downtime with rig operations. The determination of on-bottom status allows the operators to maximize weight on bit and drilling progress for the systems involved. Determination of in-slips status allows for tracking of nonproductive drilling time for operators.

Comparison of in-slips times can be made between different projects so that drilling performance capabilities can be determined. Moreover, databases can be kept for different geotechnical formations to allow for proper future planning with regards to drilling performance For example, in-slips status can be used to allow identification of downtime in hard to drill areas where drilling heads are replaced due to wearing drilling proponents.

The system can be used with a directional drilling apparatus. The directional drilling apparatus can be used in various geotechnical formations to allow more accurate positioning of the drill string in geotechnical pay zones where a pay zone is defined as an area where hydrocarbons can be withdrawn from geotechnical stratum. Of particular note, the system and method can be used with drilling for steam assisted gravity drainage ("SAGD") applications. Steam assisted gravity drainage applications drill into geotechnical stratum that have hydrocarbons locked within the matrix. The locking mechanism results from cold/permafrost applications or tar sands materials that are seated to institute a viscosity change for the trap hydrocarbons. The locking mechanism can be broken by injection of steam below ground in a series of parallel wells. To that end, the materials, methods and apparatus described herein can be used to drill either the production well or the injector well. Additionally, the methods and systems presented can be used to drill fishbone wells where different lateral wells can protrude or extended from a multitude or a single main artery well.

In addition to the above, embodiments for the method and apparatus can be used with offshore or deep water drilling rig systems. In such deep water applications, economic considerations are of primary concern due to the overall costs of operations. In further applications, the method and apparatus can be used in extended reach drilling. Extended reach drilling is defined as drilling with large horizontal deviations that extend into differing geotechnical stratum.

Data transfer from the downhole environment to the uphole environment can be accomplished by various apparatus and technologies. In one non-limiting embodiment, wired drill pipe can be used to transfer the data back and forth between the downhole and uphole environment. A rate of penetration optimizer can be used in one or more embodiments provided.

In additional embodiments, data can be transferred through the use of radio wave technology to spread data transfer from the downhole environment. Such data can be obtained from pre-existing systems, therefore the cost of new equipment needed to perform the data manipulations is relatively low.

Although only a few example embodiments have been described in detail above, those skilled in the art will readily appreciate that many modifications are possible in the example embodiments without materially departing from "Determining Drill String Status in a Wellbore." Accordingly, one or more of the modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed is:

1. A method for determining a status of a drill string in a wellbore, comprising:
   obtaining pressure data and hook load data for the drill string;
   filtering the pressure data to obtain pressure sections;
   determining a low pressure threshold based upon the pressure sections;
   filtering the hook load data to obtain hook load sections;
   determining hook load baselines based upon the hook load sections;
   determining dynamic thresholds based upon the hook load baselines; and
   determining an in-slips status of the drill string based upon the low pressure threshold, the dynamic thresholds, or both.

2. The method of claim 1, wherein the pressure data is filtered with a Kaiser filtering algorithm.

3. The method of claim 1, wherein the hook load data is filtered with a Kaiser filtering algorithm.

4. The method of claim 1, further comprising filtering the pressure data in two directions to obtain forward and backward pressure sections.

5. The method of claim 4, further comprising merging the forward and backward pressure sections to obtain merged pressure sections.

6. The method of claim 5, wherein the low pressure threshold is determined based upon inflection points in the merged pressure sections.

7. The method of claim 1, further comprising filtering the hook load data in two directions to obtain forward and backward hook load sections.

8. The method of claim 7, further comprising merging the forward and backward hook load sections to obtain merged hook load sections.

9. The method of claim 8, wherein the hook load baselines are based upon inflection points in the merged hook load sections.

10. The method of claim 8, further comprising determining breaks in the merged hook load sections.

11. A method for determining a status of a drill string in a wellbore, comprising:
    obtaining pressure data and hook load data for the drill string;
    filtering the pressure data in two directions to obtain forward and backward pressure sections;
    merging the forward and backward pressure sections to obtain merged pressure sections;
    determining a low pressure threshold based upon the merged pressure sections;
    filtering the hook load data in two directions to obtain forward and backward hook load sections;
    merging the forward and backward hook load sections to obtain merged hook load sections;
    determining hook load baselines based upon the merged hook load sections;
    determining dynamic thresholds based upon the hook load baselines; and
    determining an in-slips status of the drill string based upon the low pressure threshold, the dynamic thresholds, or both.

12. The method of claim 11, wherein the low pressure threshold is determined based upon inflection points in the merged pressure sections.

13. The method of claim 11, wherein the pressure data is filtered in two directions with a Kaiser filtering algorithm.

14. The method of claim 11, wherein the hook load baselines are based upon inflection points in the merged hook load sections.

15. The method of claim 11, wherein the hook load data is filtered in two directions with a Kaiser filtering algorithm.

16. A computer readable medium, that when executed by a processor, is configured to control a method for determining a status of a drill string in a wellbore, wherein the method comprises:
   obtaining pressure data and hook load data for the drill string;
   filtering the pressure data to obtain pressure sections;
   determining a low pressure threshold based upon the pressure sections;
   filtering the hook load data to obtain hook load sections;
   determining hook load baselines based upon the hook load sections;
   determining dynamic thresholds based upon the hook load baselines; and
   determining an in-slips status of the drill string based upon the low pressure threshold, the dynamic thresholds, or both.

17. The computer readable medium of claim 16, wherein the pressure data is filtered with a Kaiser filtering algorithm.

18. The computer readable medium of claim 16, wherein filtering the pressure data comprises filtering the pressure data in two directions to obtain forward and backward pressure sections.

19. The computer readable medium of claim 18, wherein filtering the pressure data further comprises merging the forward and backward pressure sections to obtain merged pressure sections.

20. The computer readable medium of claim 19, wherein determining the low pressure threshold comprises determining the low pressure threshold based upon inflection points in the merged pressure sections.

* * * * *